United States Patent [19]

Irwin et al.

[11] 3,821,665

[45] June 28, 1974

[54] TEMPERATURE COMPENSATED CRYSTAL OSCILLATOR

[75] Inventors: James S. Irwin, Ft. Lauderdale, Fla.; John R. Morton, Streamwood, Ill.

[73] Assignee: Motorola, Inc., Chicago, Ill.

[22] Filed: June 11, 1973

[21] Appl. No.: 369,047

[52] U.S. Cl. ................ 331/116 R, 331/66, 331/176

[51] Int. Cl. ............................................ H03b 5/36

[58] Field of Search .......... 331/66, 116 R, 158, 164, 331/176

[56] References Cited

UNITED STATES PATENTS

| | | | |
|---|---|---|---|
| 3,176,244 | 3/1965 | Newell et al. | 331/176 X |
| 3,454,903 | 7/1969 | Page | 331/176 X |
| 3,713,033 | 1/1973 | Frerking | 331/176 X |
| 3,719,838 | 3/1973 | Peduto et al. | 331/176 X |

*Primary Examiner*—H. K. Saalbach
*Assistant Examiner*—Siegfried H. Grimm
*Attorney, Agent, or Firm*—Eugene A. Parsons; Vincent Rauner

[57] ABSTRACT

An oscillator having a frequency determining crystal connected therein which produces a frequency deviation with temperature defined by a formula including first, second and third order terms and a varactor connected to said oscillator for varying the frequency of said oscillator in response to a voltage produced by a function generating means which produces a frequency variation of the varactor that is equal to and the inverse of the frequency deviation of the oscillator so that the total effect of temperature variations on the circuit is little or no frequency deviations with ambient temperature changes.

5 Claims, 5 Drawing Figures

TEMPERATURE COMPENSATED CRYSTAL OSCILLATOR

BACKGROUND OF THE INVENTION

1. Field of the Invention

Many circuits require oscillators which remain stable throughout predetermined temperature ranges. Frequency tolerances in the past have sometimes required an accuracy of only 10 parts per million or less. Today, however, it is frequently necessary that this accuracy be reduced to 1 or even to 0.1 parts per million and the requirement for greater accuracy is continually increasing. While the components of frequency determining means for an oscillator are chosen so that the oscillator resonates at a predetermined frequency, ambient temperature variations can and do affect the oscillator to cause frequency drift or variation. When an uncompensated quartz crystal, for example, is used as the frequency determining means, the frequency may vary from 10 parts per million to 100 parts per million over a given temperature range depending upon the angle of the cut of the crystal. Over a temperature range of $-30°C$ to $+80°C$ the frequency variations of the crystal follow a curve generally in the form of an S, which curve is defined by the following equation:

$$\Delta f/f = a(T - T_r) + b(T - T_r)^2 + c(T - T_r)^3$$

where $a$, $b$ and $c$ are coefficients which depend upon the angle of cut of the crystal, $T$ is the temperature of the oscillator in degrees centrigrade, $T_r$ is a reference temperature in degrees centrigrade, $\Delta f$ is the frequency excursion referenced to the frequency measured at $T_r$ and $f$ is the crystal frequency at temperature $T_r$.

2. Description of the Prior Art

In prior art structures some attempts have been made to compensate for frequency variations due to temperature changes by attempting to provide a curve that is the reciprocal of the frequency drift of the uncompensated crystal with respect to ambient temperature variations. In general, these prior art devices utilize thermistors and the like having negative temperature coefficients of resistivity in complicated impedance networks. These impedance networks are generally relatively complicated to build and are extremely complicated to alter or adjust.

SUMMARY OF THE INVENTION

The present invention pertains to apparatus and methods for temperature conpensating crystal oscillators wherein a voltage variable reactance means is connected to the oscillator and function generating means are connected to the reactance means for providing a control voltage to the reactance means having a first, second and third order term therein to control the reactance means such as to have an effect on the oscillator frequency which is equal and opposite to that of temperature variations on the crystal and other oscillator components.

It is an object of the present invention to provide an improved temperature compensated crystal oscillator.

It is a further object of the present invention to provide a temperature compensated crystal oscillator including a voltage variable reactance means and function generating means supplying a control voltage to the reactance means to reduce or remove frequency variations of the oscillator due to temperature changes.

It is a further object of the present invention to provide adjustable function generating means for controlling a voltage variable reactance means so that the reactance thereof varies in a predetermined manner defined by an equation containing first, second and third order terms.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figures 1, 2:
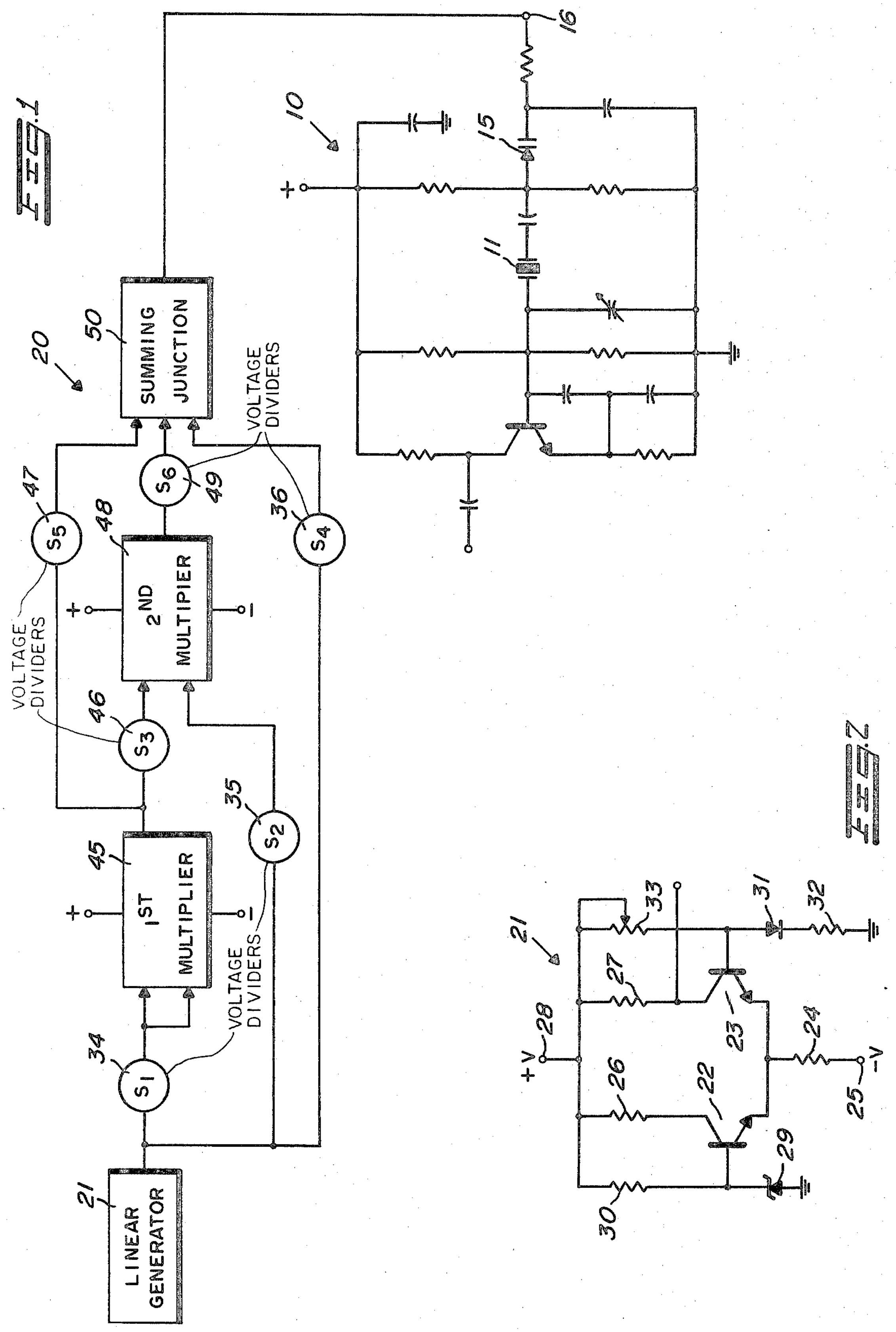
FIG. 1 is a semi-block/semi-schematic drawing of a temperature compensated crystal oscillator incorporating the teachings of the present invention.
FIG. 2 is a schematic diagram of an embodiment of a linear voltage generator.
Figure 3:
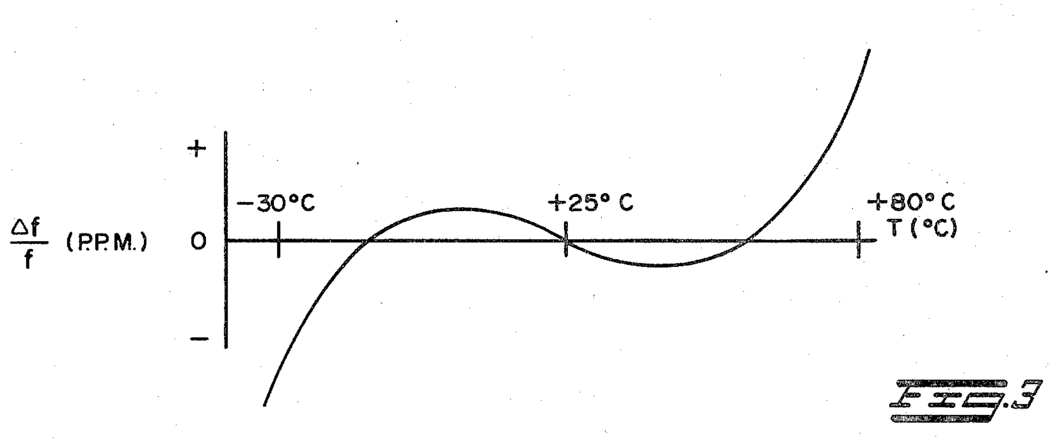
FIG. 3 is a typical graphical representation of the frequency deviation of a crystal with temperature changes.

Referring specifically to FIG. 1, the numeral 10 generally designates an oscillator having a frequency determining crystal 11 connected therein. In the present embodiment the crystal 11 is an AT cut crystal which is cut at an angle of approximately 35°22′. The frequency deviation of the oscillator 10 with ambient temperature changes is depicted by the curve of FIG. 3. The curve in FIG. 3 is defined by the equation $$\Delta f/f = a(T - T_r) + b(T - T_r)^2 + c(T - T_r)^3.$$

It should be understood that this is a general equation which it is believed applies directly to all quartz crystals (although some terms may be zero) and may, with some minor variations, apply to other types of crystals. It should further be understood that virtually any type of oscillator may be provided which has a crystal connected therein for determining the frequency thereof and the present teachings may be utilized for providing a compensating circuit therefor.

Figure 4:
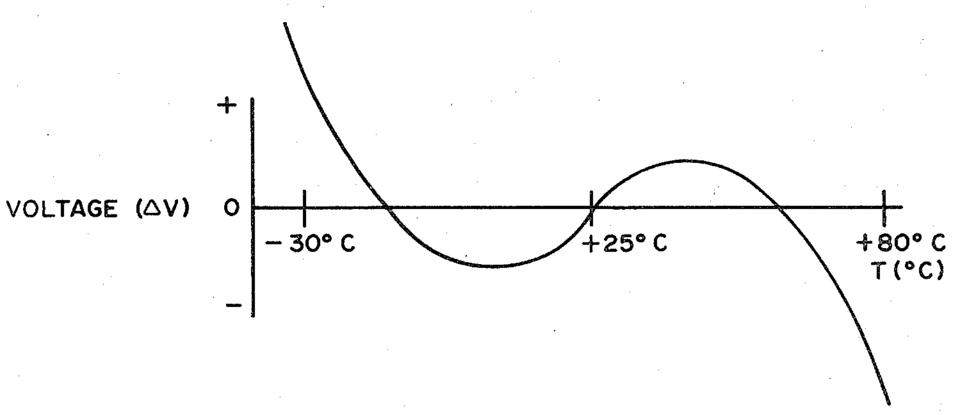
FIG. 4 is a graphical representation of the control voltage applied to the voltage variable reactance means to compensate for the crystal frequency versus temperature variations illustrated in FIG. 3.

A voltage variable reactance means, which in this embodiment is a varactor 15, is connected to the oscillator 10 so as to vary the frequency of the oscillator 10 in response to a control voltage applied to an input terminal 16. The frequency sensitivity of the varactor 15 is defined by the equation $$S = \Delta f/f/\Delta v$$

where $\Delta f/f$ is the frequency deviation in parts per million (ppm) and $\Delta v$ is the control voltage change applied to the varactor 15. To compensate for variations of the oscillator 10 with temperature, the control voltage applied to terminal 16 must vary the reactance of the varactor 15 so as to have an effect on the oscillator 10 which is the inverse of crystal frequency versus temperature changes. A typical control voltage versus temperature curve is illustrated in FIG. 4. This curve is defined by the equation $$\Delta v = [K_a(T - T_r) + K_b(T - T_r)^2 + K_c(T - T_r)^3]$$

where $K_a$, $K_b$ and $K_c$ are variables the value of which is dependent upon the angle and design of crystal 11, the specific varactor 15 used and the specific configuration of the oscillator 10.

A function generator, generally designated 20, is connected to the terminal 16 for supplying a control voltage thereto as depicted in FIG. 4. The function generator 20 includes a linear generator 21 which generates a voltage at the output that is linear over a predetermined temperature range. Linear voltage generators are relatively numerous and typical examples are forward biased diodes and bipolar transistor junctions, reverse biased zener diodes, and diode-resistor bridge circuits, and linearized resistor-thermistor voltage divider circuits. The output of the generator 21 is supplied to scaling factor means, which in this embodiment includes three resistive voltage dividers 34, 35 and 36.

Referring to FIG. 2, a schematic diagram of an exemplary embodiment of the linear voltage generator 21 is illustrated. In this embodiment a pair of transistors 22 and 23 have common connected emitters which are connected through a resistor 24 to a terminal 25 having a negative voltage supplied thereto. The emitters are connected through a pair of resistors 26 and 27, respectively, to a terminal 28 having a positive voltage supplied thereto. The base of the transistor 22 is connected to the cathode of a zener diode 29, the anode of which is connected to ground and is also connected through a resistor 30 to the positive voltage terminal 28. The base of the transistor 23 is connected to the anode of a diode 31, the cathode of which is connected through a resistor 32 to ground and the base is also connected to one fixed terminal of a potentiometer 33. The movable contact and the other fixed terminal of the potentiometer 33 are connected together and to the positive voltage terminal 28. The potentiometer 33 is adjusted so that the voltage on the bases of the transistors 22 and 23 are equal at the inflection temperature, which in the present embodiment is 25°C. It will of course be understood that the inflection temperature will vary somewhat with the angle of cut of the crystal 11 but the inflection temperature variation is negligible for small variations in the angle of cut (on the order of 2 to 5 minutes) and may be assumed constant for batches of similarly cut crystals. The linear voltage output is obtained from the collector of the transistor 23 and, in this embodiment, the overall circuit is adjusted so that the linear voltage output passes through 0 when the ambient temperature of the circuit is at 25°C. The linear voltage generator will always be adjusted so that the linear voltage output thereof passes through 0 at the inflection temperature of the crystal 11. This will insure that the compensating voltage applied to the terminal 16 will coincide with the frequency versus temperature deviation of the oscillator 10. The resistor 24 should be large to reduce the effects of supply voltage variations or a constant current source may be incorporated in the emitter circuit.

Figure 5:
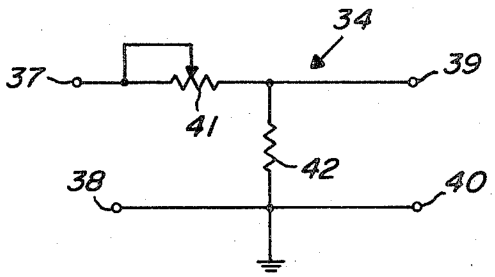
FIG. 5 is a schematic diagram of an embodiment of a scaling factor means utilized in the function generator of FIG. 1.

In the present embodiment all of the resistive voltage dividers are similar and a schematic diagram of resistive voltage divider 34 is illustrated in FIG. 5 for exemplary purposes. The divider 34 includes a pair of input terminals 37 and 38 and a pair of output terminals 39 and 40. The input terminal 38 and output terminal 40 are connected directly together and to ground. The input terminal 37 is connected to the adjustable contact and a fixed contact of a potentiometer 41. The other fixed contact of the potentiometer 41 is connected to the output terminal 39 and to one side of a resistor 42, the other side of which is connected to ground. By adjusting the potentiometer 41 the scale factor of the voltage input to the voltage output is adjusted so that a signal applied to the input terminals 37 and 38 can be provided with an adjustable constant component. It should be understood that other scaling factor means might be devised by those skilled in the art but the illustrated embodiment is utilized because of its simplicity and ease of adjustment.

A first multiplier 45 has a pair of inputs, which receive the signals that are multiplied together, and an output. The two inputs to the multiplier 45 are the same and both come from the resistive voltage divider 34. Thus, the first multiplier 45 provides a second order term or the square of the linear (first order) term times a constant. Circuits such as multipliers 45 are well known in the art and are available commercially from a number of manufacturers in IC form. The output of multiplier 45 is supplied to scaling factor means including two resistive voltage dividers 46 and 47, similar to resistive voltage divider 34.

A second multiplier 48, similar to multiplier 45 receives a signal on a first input from the voltage divider 46 and on the second input from the voltage divider 35. Since the signal from the voltage divider 46 is a second order term and the signal from the voltage divider 35 is a first order term, the output of the multiplier 48 is a third order term or the cube of the linear signal from the generator 21. The output of the multiplier 48 is applied to scaling factor means including a resistive voltage divider 49, similar to the resistive voltage divider 34. The various gains, if any, in the generator 21 and the multipliers 45 and 48, the amount of voltage change with a unit change in temperature in the generator 21 and the scale factors $S_1$, $S_2$ and $S_3$ or adjustments of the voltage dividers 34, 35 and 46 are all arbitrary except that each of these factors must be set so that each of the inputs and outputs of the various circuit components do not exceed performance restrictions. The various gains and adjustments mentioned above may be fixed for any specific design.

A summing junction or circuit 50 has three inputs and an output. The summing junction 50 may be any well known resistor network or other circuit which provides a signal at the output that is the sum of the three signals at the input thereof. The output terminals of the voltage dividers 36, 47 and 49 are connected to the three inputs of the summing junction 50. Thus, the first input terminal of the summing junction 50 receives a linear or first order term multiplied by a constant $K_1$, which is supplied by the voltage divider 36. The second input of the summing junction 50 receives the square or second order term multiplied by a constant $K_2$, which is supplied by the voltage divider 47. The third input of the summing junction 50 receives the cube or third order term multiplied by a constant $K_3$, which is provided by the voltage divider 49. The summing junction 50 adds the three terms together to provide a voltage at the output which is defined by the equation $$\Delta v = -[K_1(T-T_r) + K_2(T-T_r)^2 + K_3(T-T_r)^3]$$

where $K_1$ is the constant adjusted by the voltage divider 36, $K_2$ is the constant adjusted by the voltage divider 47 and $K_3$ is the constant adjusted by the voltage divider 49. The output of the summing junctions 50 is connected to the input terminal 16 of the oscillator 10.

Utilizing the equation for the frequency sensitivity of the varactor 15 and substituting the equation for $\Delta v$, an equation can be written for the frequency variations of the oscillator 10 due solely to the control voltage applied to the varactor 15. The equation is $$\Delta f/f = -S[K_1(T-T_r) + K_2(T-T_r)^2 + K_3(T-T_r)^3]$$

where $K_1$, $K_2$ and $K_3$ include the various fixed and arbitrary constants previously mentioned and variable or adjustable constants determined by voltage dividers 36, 47 and 49, respectively, as set forth in more detail below.

$$K_1 = K_z S_4$$

$$K_2 = (K_z S_1)^2 K_{M1} S_5$$

$$K_3 = (K_z)^3 S_1^2 S_2^2 S_3 S_6 K_{M1} K_{Mz}$$

where:

$K_z = \Delta V$ (volts)/$\Delta T$ (°C) for the output of generator 21

$S_1$, $S_2$, $S_3$, $S_4$, $S_5$ and $S_6$ are the scale factors of the resistive voltage dividers 34, 35, 46, 36, 47 and 49

$K_{M1}$ and $K_{Mz}$ are the gains of the multipliers 45 and 48

Since the Δf/f of the oscillator 10 produced by the varactor 15 must be equal and inverse to the curve illustrated in FIG. 3, the constants $K_1$, $K_2$ and $K_3$ must be adjusted so that their amplitudes are equal to the constants *a*, *b* and *c* (of the equation defining the curve illustrated in FIG. 3). To accomplish this with a minimum amount of effort, the summing junction 50 is disconnected from the terminal 16 and the frequency deviation at the output of the oscillator 10 is measured at three different temperatures other than the inflection temperature (at which the output frequency deviation is 0). Since the frequency sensitivity, *S*, of the varactor 15 is known or can be measured, it is only necessary to write three equations and solve for the three unknowns, $K_1$, $K_2$ and $K_3$ after which the voltage dividers 36, 47 and 49 can be adjusted to provide these constants. The output voltage $\Delta v$ of the summing junction 50 is similar to that illustrated in FIG. 4 and, when multiplied by the frequency sensitivity, *S*, of the varactor 15 will be equal to and the inverse of the curve illustrated in FIG. 3.

Thus, the function generator 20 and varactor 15 accurately compensate the output frequency of the oscillator 10 for variations in ambient temperature so that the output of the oscillator 10 is extremely temperature stable. Further, the function generator 20 is relatively simple to adjust since there are only three variables, voltage dividers 36, 47 and 49, and only three relatively simple measurements of the frequency deviation at the output of the oscillator 10 need be made to adjust the function generator 20. Although third order equations have been used throughout the description for exemplary purposes, it should be understood that more complicated equations, including higher order terms, might be involved. In these instances additional multipliers and scale factors can be added to obtain these higher order terms in accordance with the teachings herein.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

We claim:

1. A temperature compensated crystal oscillator comprising:
   a. an oscillator having a frequency determining crystal connected therein;
   b. voltage variable reactance means connected to said oscillator for varying the frequency of said oscillator in response to a voltage applied to said reactance means;
   c. generating means providing a voltage which varies linearly with temperature;
   d. first multiplying means coupled to said generating means for providing a voltage which is the square of the voltage from said generating means;
   e. second multiplying means coupled to said generating means for providing a voltage which is the cube of the voltage from said generating means; and
   f. summing means coupled to said generating means, said first multiplying means, said second multiplying means and said voltage variable reactance means for supplying a voltage to said reactance means proportional to the sum of the voltages from said generating means and said first and second multiplying means.

2. A temperature compensated crystal oscillator as claimed in claim 1 including in addition three scaling factor means coupling the generating means and the first and second multiplying means to the summing means, respectively, for providing the linear, square and cube voltages each with a predetermined amplitude to provide a sum voltage which controls the reactance means to vary the frequency of the oscillator the inverse of variations of the oscillator due to temperature changes thereof.

3. A temperature compensated crystal oscillator as claimed in claim 2 wherein the scaling factor means each include variable means for varying the output amplitude of voltages applied thereto.

4. A temperature compensated crystal oscillator as claimed in claim 1 wherein the crystal is an AT cut quartz crystal.

5. A temperature compensated crystal oscillator comprising:
   a. an oscillator having a frequency determining crystal connected therein;
   b. voltage variable reactance means connected to said oscillator for varying the frequency of said oscillator in response to a voltage applied to said reactance means; and
   c. function generating means connected to supply a control voltage to said reactance means for varying the frequency of said oscillator inversely to variations in the frequency of said oscillator caused by variations in temperature of said oscillator, said function generating means including a linear generator and at least one multiplier for producing higher order terms proportional to the frequency variations of said oscillator due to the variations in temperature of said oscillator.

* * * * *